US008469300B2

(12) United States Patent
Camp

(10) Patent No.: US 8,469,300 B2
(45) Date of Patent: Jun. 25, 2013

(54) SPINNING REEL

(75) Inventor: Charles D. Camp, Eastaboga, AL (US)

(73) Assignee: Eastaboga Tacle Mfg. Co., Inc., Eastaboga, AL (US)

( * ) Notice: Subject to any disclaimer, the term of this patent is extended or adjusted under 35 U.S.C. 154(b) by 159 days.

(21) Appl. No.: 13/137,132

(22) Filed: Jul. 22, 2011

(65) Prior Publication Data

US 2013/0020424 A1 Jan. 24, 2013

(51) Int. Cl.
*A01K 89/01* (2006.01)

(52) U.S. Cl.
USPC .......................... 242/245; 242/295; 242/301

(58) Field of Classification Search
USPC ............... 242/243, 244, 245, 246, 291, 292, 242/295, 301
See application file for complete search history.

(56) References Cited

U.S. PATENT DOCUMENTS

| | | | |
|---|---|---|---|
| 2,650,040 A | 12/1949 | Glaser | 242/84.1 |
| 3,144,217 A | 8/1957 | Wood, Jr. | 242/84.21 |
| 2,918,227 A | 12/1959 | Mauborgne | 242/84.21 |
| 3,948,465 A | 4/1976 | Scusa | 242/219 |
| 4,196,870 A * | 4/1980 | Puryear | 242/245 |
| 4,200,248 A * | 4/1980 | Puryear | 242/245 |
| 4,416,427 A | 11/1983 | Kawai | 242/84.2 |
| 4,577,807 A | 3/1986 | Urso | 242/84.2 |
| 5,863,007 A | 1/1999 | Sato | 242/264 |
| 7,234,660 B2 | 6/2007 | Kitajima et al. | 242/247 |
| 2007/0114314 A1* | 5/2007 | Bin Ahmad | 242/245 |
| 2007/0278335 A1 | 12/2007 | Fox et al. | 242/224 |

* cited by examiner

*Primary Examiner* — Emmanuel M Marcelo
(74) *Attorney, Agent, or Firm* — Jacobson Holman PLLC

(57) ABSTRACT

A fishing spinning reel having a housing and rotatably carrying a shaft between a crank handle and a main gear. The main gear drives a pinion gear shaft rotatably carried on one end by the housing. On the other end of the housing is mounted a rotor. Mounted on the housing, between the housing and the rotor, is a cup washer with male threads on the outside and a notch in the cup end facing the rotor. A clutch sleeve, non-rotatably attached to the rotor, around which a one way roller clutch locks, instantly engages a braking disc as the rotor rotates backwards and releases as the rotor turns forward. A frictioning disc is located on either side of the braking disc. A washer with a cleat is pushed towards the housing against the frictioning disc by a spring washer and is kept from rotation by the cleat inside the notch on the cup washer. The spring washer is pulled toward the housing by a tension adjusting drum.

19 Claims, 8 Drawing Sheets

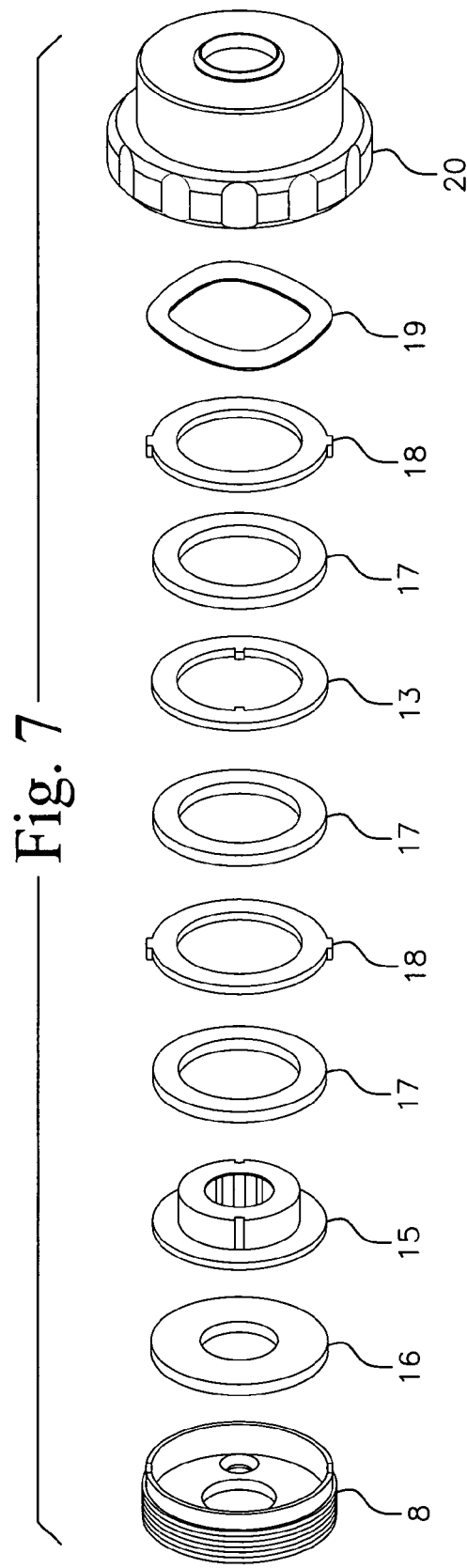

SPINNING REEL

FIELD OF THE INVENTION

The present invention relates to a spinning reel for fishing and, more particularly, to an improvement in a drag mechanism for controlling paying out of fishing line. The invention is a new type of spinning reel that is designed to test and challenge an angler's skill and reflexes much more than typical spinning reels and gives the angler more control when fighting a fish. In typical spinning reels, the drag controls the spool and with the spinning reel of the present invention, the drag controls the rotor.

BACKGROUND OF THE INVENTION

With typical spinning reels, the drag is normally set at about ⅓ the breaking strength of the line. This allows for enough pressure to set the hook and keep the quick start up pressure at less than the breaking strength of the line. As a fish makes a run, the drag lets the spool unwind at a set pressure to avoid breaking the line. The angler does not have to be alert or react for the drag to work.

Generally, a spinning reel is provided at a front part of a spool with a drag mechanism which is adapted to control the paying out of fishing line due to reversing of the spool in accordance with the pulling force of the fish. This drag mechanism, mounted on the spool, however, poses problems that may cause the fishing line to be twisted.

In order to overcome these problems, it has been proposed to mount a drag mechanism at a rear part of a rotor, as shown in Japanese Utility Model Laid-Open Application No. 132888/1977. However, the adjustment of the braking force is difficult during the taking up of the fishing line because the manipulation knob of the drag mechanism is rotating during operation of the drag mechanism.

The drag mechanism, including a braking disc, braking member and manipulation knob, is rotated as a unit with the rotor to impart an unnecessarily large inertia to the rotor so as to hinder the swift manipulation of the handle. In addition, since the manipulation knob has to be installed between the housing and the rotor, the length of the reel in the axial direction of the spool is increased, resulting not only in an increase of a size of the reel but also in a rough adjusting operation.

In order to overcome these problems, U.S. Pat. No. 4,416,427 has a drag mechanism of a one way engagement type which engages the rotor only when the rotor is reversed. The drag adjustment knob is mounted at the back of the housing. The reason for this is because U.S. Pat. No. 4,416,427 relates to a spinning reel of a skirted spool type.

The inherent problems with having rotor drag on a skirted spool spinning reel are (1) the rotor has protrusions (bail, bail arms, bail closing mechanism, etc.) which eliminate a possibility of manually palming the rotor for increased drag, (2) protrusions are likely to strike the angler's fingers during rapid fish runs, and (3) putting the drag adjustment knob on the back of the housing increases the bulk and weight of the reel, increases the number of parts in the reel and creates a place where line can become entangled. Furthermore, the spinning reel of U.S. Pat. No. 4,416,427 incorporates engaging claws to engage drag discs with the rotor. This is not an instantly engaging mechanism, which means there will be a good bit of free backward rotor rotation before the claws engage, creating loose line and a hesitation before hook sets. Loose line coupled with twisted line creates most of the line tangling problems associated with spinning reels. It is also difficult to seal this mechanism from contaminates.

Furthermore, the spinning reel of U.S. Pat. No. 4,416,427 requires additional parts for locking the rotor for storage.

SUMMARY OF THE INVENTION

It is, in order to eliminate the problems of the prior art, one object of the present invention to provide a spinning reel, of a rotor drag type, with a mechanism that will instantly engage drag discs with a rotor upon backward rotation of the rotor, that will eliminate loose line and make for an instant hook set.

By the spinning reel of the present invention, the spool is fixed, with no drag. The drag lets the rotor unwind at a set pressure to avoid breaking the line. The drag may be set close to zero for more exciting runs, or to ⅓ or more of the breaking strength of the line for easier fighting of the fish. This is possible because the hook is set by hand on the crank handle, allowing for 100% line pressure. As the fish makes a run, the angler might let the handle revolve backwards while keeping their hand on it, or take their hand off of the crank handle to allow the drag pressure to control the counter rotation of the rotor. The drag will keep the crank handle from revolving so fast as to hurt the angler's fingers.

As the fish tires, the angler can put up to 100% line pressure by keeping their hand on the crank handle, or can let go instantly of the crank handle to engage the drag setting. This gives the angler much quicker and greater fluctuation of line pressure which requires much greater skill, but gives much greater control.

It is another object of the present invention to provide a spinning reel, of a rotor drag type, which has a drag adjustment knob, that when in the released position, will lock the rotor, eliminating the need for an anti-backup mechanism.

It is still yet another object of the present invention to provide a spinning reel, of a rotor drag type, with a drag mechanism that is sealed, keeping out contaminates (water, sand, etc.).

It is still yet another object of the present invention to provide a spinning reel, of the rotor drag type, with an internal spool rotor, with a flange to which, on a spool side, line pick up roller guide(s) are mounted, with a housing side of the rotor with a flange free of protrusions so that an area of the rotor might be palmed for added drag and will lessen a chance for injury when a fish makes a fast run or line is retrieved quickly.

It is still yet another object of the present invention to provide a spinning reel, of a rotor drag type, with a drag adjustment knob (non-rotatable with the rotor) on the housing, located between the rotor and the housing that decreases length, bulk, weight and number of parts of the reel, as well as eliminating protrusions that line might become entangled in and can be adjusted while playing a fish.

These and other objects of the invention, as well as many of the intended advantages thereof, will become more readily apparent when reference is made to the following description taken in conjunction with the accompanying drawings.

BRIEF DESCRIPTION OF THE DRAWINGS

The following drawings illustrate examples of various components of the invention disclosed herein, and are for illustrative purposes only. Other embodiments that are substantially similar can use other components that have a different appearance.

FIGS. 6 and 7 illustrate alternate embodiments of FIGS. 3A and 5, respectively.

DETAILED DESCRIPTION OF THE PREFERRED EMBODIMENTS

Figure 1:
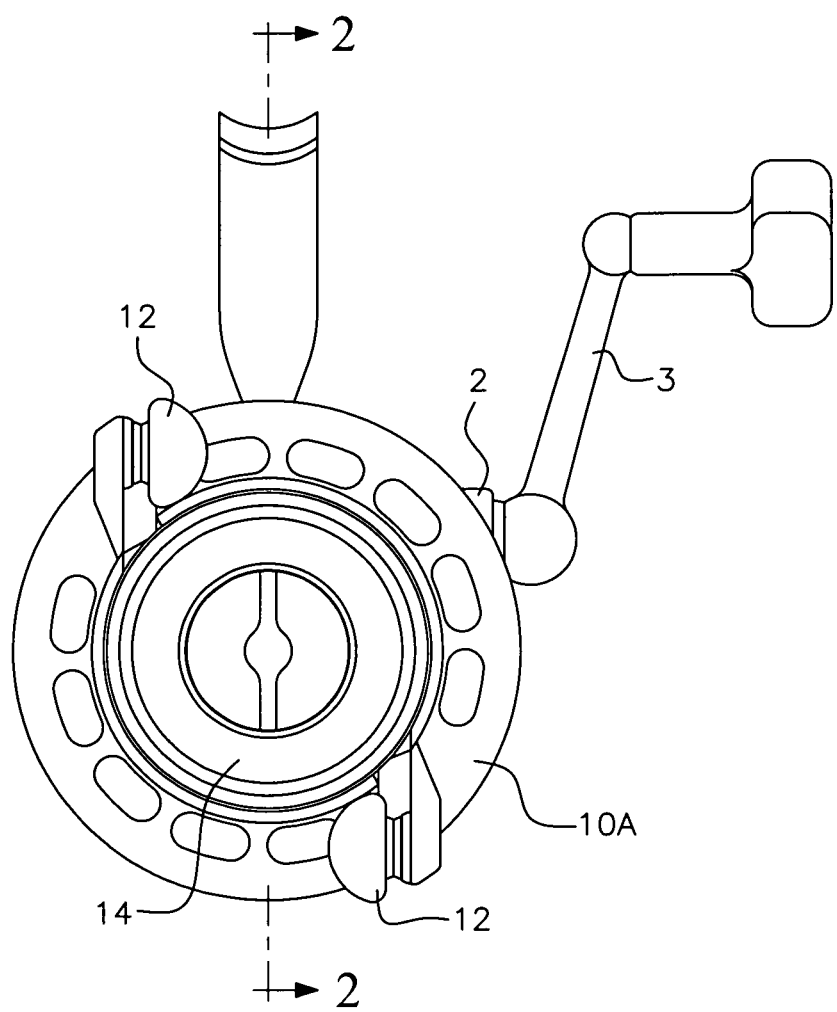
FIG. 1 is a front elevational view of a spinning reel according to the present invention.
Figure 2:
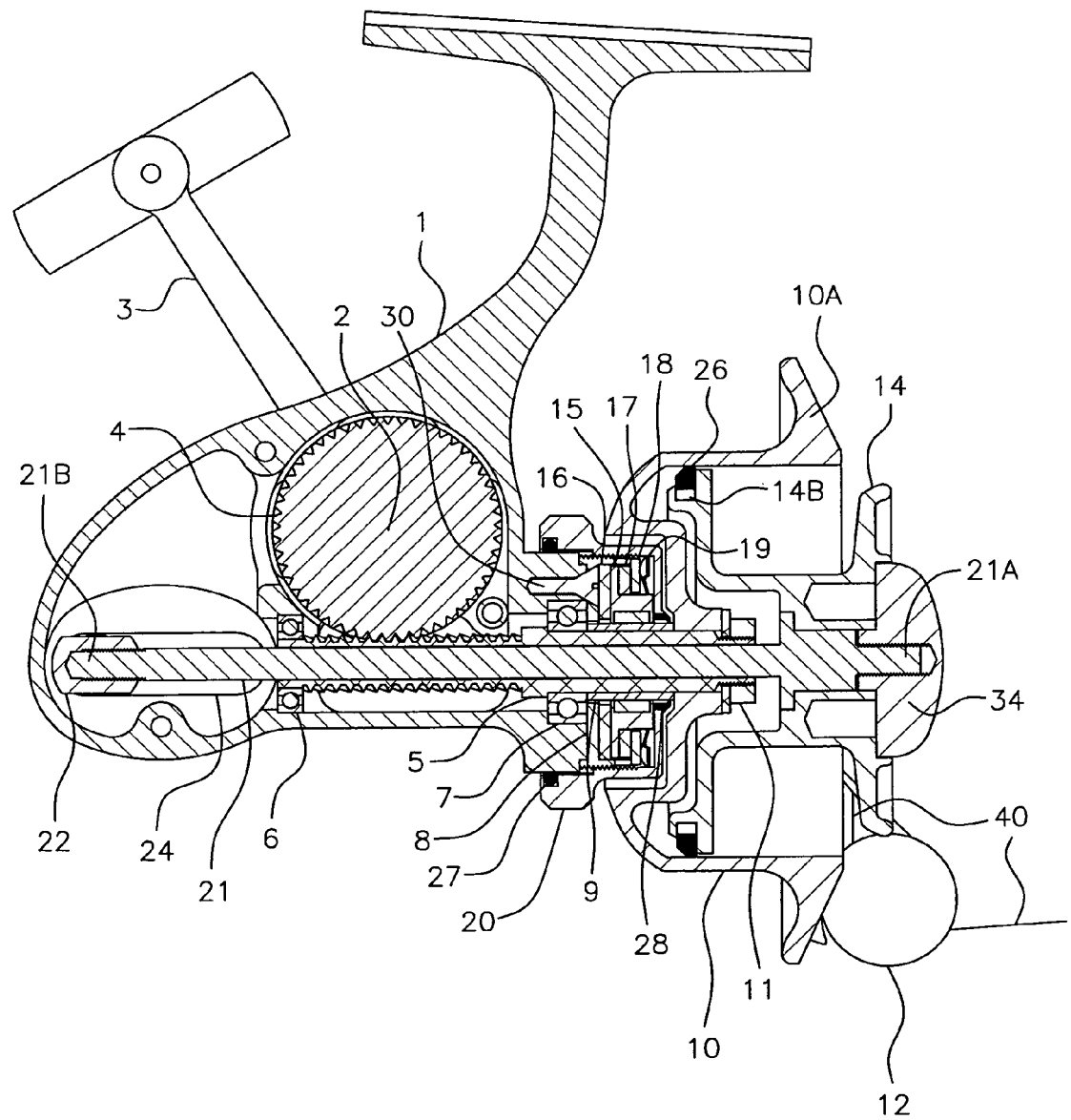
FIG. 2 is an enlarged side sectional view of the spinning reel taken along line 2-2 of FIG. 1.
Figure 3A:
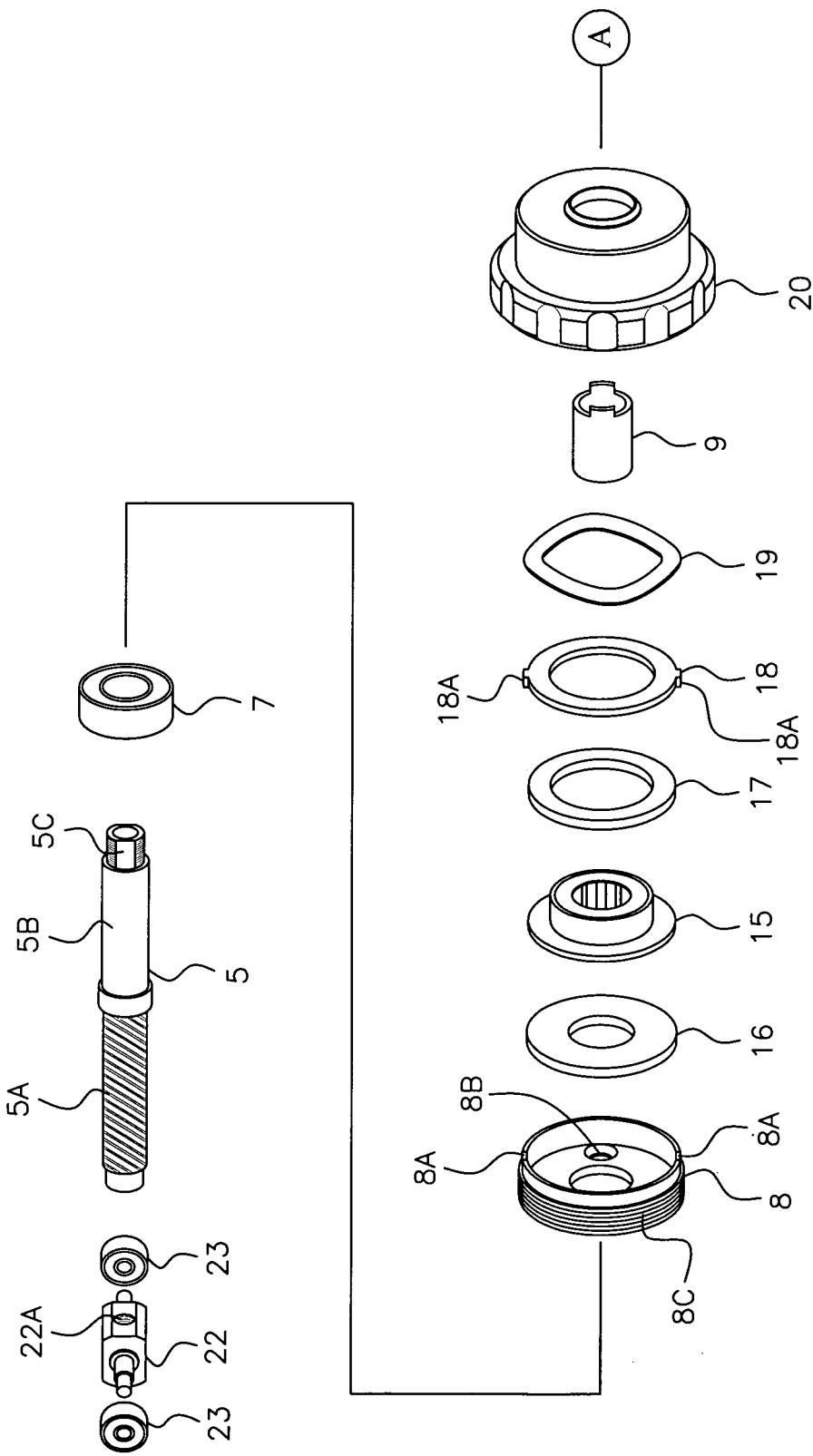
FIGS. 3A and 3B are continuous exploded perspective views of a part of the spinning reel of the embodiment according to that shown in FIG. 2.
Figure 3B:
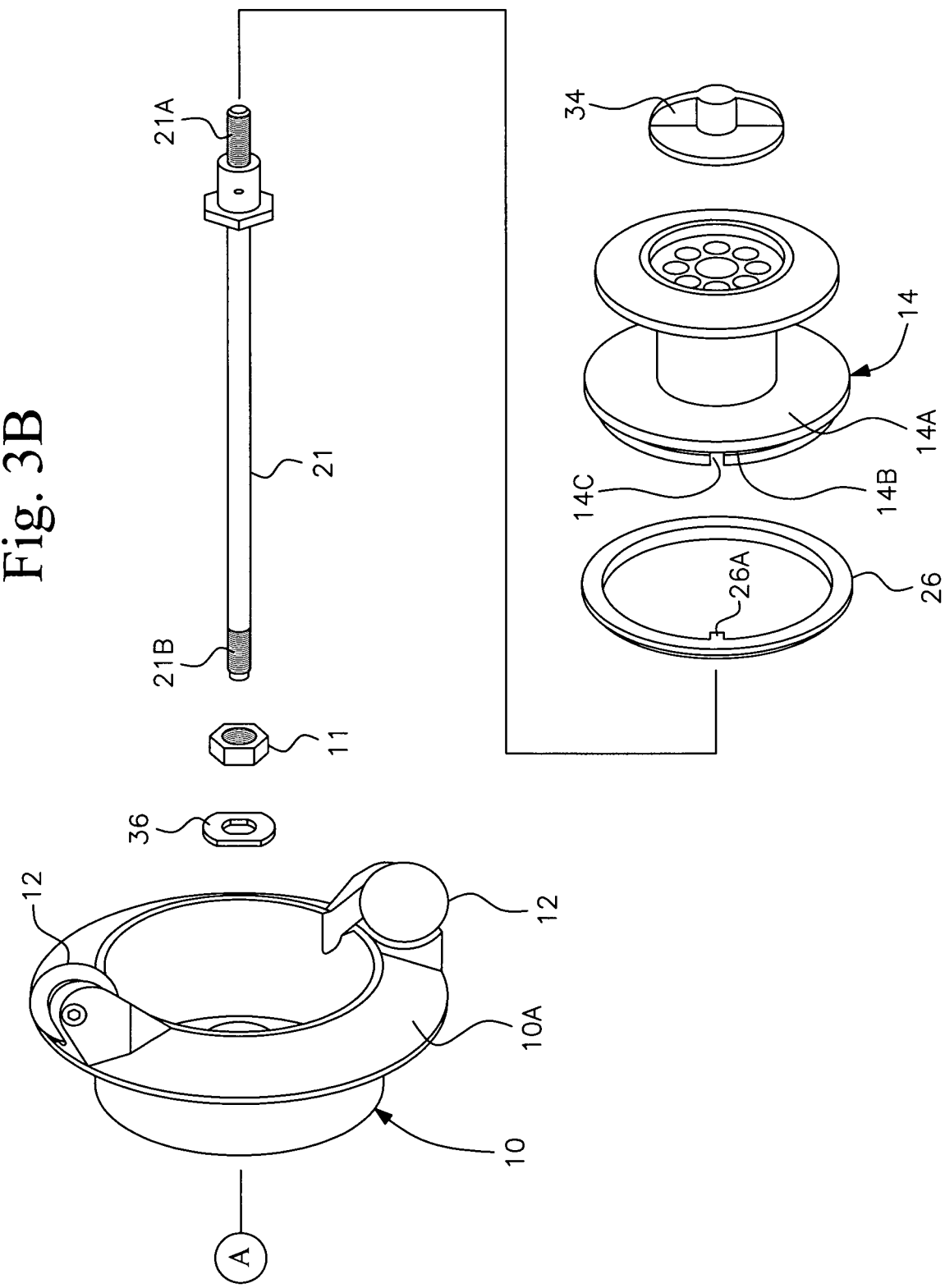

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Referring first to FIGS. 1 to 4, showing a preferred embodiment of the present invention, a housing 1 is provided at its upper side with a mounting structure (known in the art) for attaching the housing to a fishing rod. A rotary shaft 2 is driven by a crank handle 3 and is connected to a main gear 4 as is well known in the art.

A rear section 5A of a pinion gear shaft 5 engages with the main gear 4, and is rotatably supported in the housing 1 by bearing 6 and main bearing 7. Front section 5B of pinion shaft 5 projects from the front end of the housing 1. Main bearing 7 engages a shoulder between rear section 5A and front section 5B. Main bearing 7 is retained in the housing between the shoulder of the pinion gear shaft 5 and an externally threaded main bearing retainer drag cup 8.

A hollow clutch sleeve 9 fits over the front end portion 5B of the pinion gear shaft 5. A rotor 10 is attached to a leading end of front end portion 5B by a nut 11 and washer 36 on end 5C of shaft 5 for unitary rotation therewith.

The rotor 10 has roller guides 12 mounted to a flange portion 10A in a line trapping pocket. The roller guides, during rotation of the rotor, wind line 40 onto the non-rotatable spool 14. The rotor 10 also has a protrusion free area 25 (FIG. 4) for manual application of additional drag pressure.

The flange 14A of the spool 14 that rides inside the rotor 10 has a groove 14B in which a hard ring 26 is loosely fitted. This hard ring 26, kept from rotation by an inside cleat 26A engaged in a slot 14C of spool 14, fits with just enough clearance in the rotor 10 to allow free movement and to keep line from getting tangled between the spool 14 and rotor 10.

A one way roller clutch braking assembly 15 is clamped between frictioning members 16, 17. The assembly 15 may be made of a single combined piece or a separate disc and clutch assembled together in a known manner. Frictioning members 16, 17 are washers of materials such as leather, cork, etc. The combined clutch braking assembly 15 and the frictioning members 16, 17 are supported in the retainer drag cup 8 on one side by an interior radially extending wall of the main bearing retainer drag cup 8 and on the other side by an outside cleated disc 18. The cleats 18A of disc 18 fit inside notches 8A in the main bearing retainer drag cup 8 and are thereby kept from rotation. Screws 30 fit into countersunk holes 8B in drag cup 8 to secure the drag cup 8 on the housing 1.

A wave spring washer 19 is placed between the tension adjusting drum 20 and the outside cleated disc 18 in drag cup 8 to bias the tension adjusting drum 20 away from the drag cup 8. The tension adjusting drum 20 has internal threads that engage the external threads 8C of the main bearing retainer drag cup 8 for free forward and backward movement of the tension adjusting drum 20. The tension adjusting drum 20 has seals 27, 28 to keep out contaminants such as water, dirt, sand, etc. As the tension adjusting drum 20 is rotated by the angler in either direction, the pressure contact of the wave spring washer 19 against the outside cleated disc 18 is freely adjusted.

A spool shaft 21 is attached to non-rotatable spool 14 at end 21A by coupler 34. The spool shaft 21 extends through a central opening of the pinion gear shaft 5. On the housing end 21 B of the spool shaft 21 is attached a spool shaft axle 22 having threaded hole 22A and bearings 23 on each end of axle 22. The bearings 23 that ride in recessed slots 24 in the housing 1. This allows for free back and forth reciprocating movement of the shaft 21 under a load in the axial direction while keeping the shaft 21 from rotating. This allows for the reciprocating of spool shaft 21 for laying line level on the spool 14 as fed from roller guides 12.

As the rotor 10 is rotated in the taking up direction by a rotation of the crank handle 3 through the combined action of the main gear 4, the pinion gear shaft 5 and the clutch sleeve 9, the one way roller clutch braking assembly 15 is disengaged so that the rotor 10 is allowed to turn freely. This enables the taking up of fishing line on the spool 14.

In contrast, as the fishing line is pulled by the fish and paid out to cause a reversing rotation of the rotor 10, the one way roller clutch braking assembly 15 grips the non-rotatably mounted clutch sleeve 9 so that the rotor 10 rotates integrally with the one way roller clutch braking assembly 15 which is clamped by the frictioning members 16, 17. As a result, the rotor 10 is braked (the drag is engaged).

The braking force is adjusted by rotation of the tension adjusting drum 20 by the angler turning the tension adjusting drum. The tension adjusting drum is engaged on the external threads of the main bearing retainer drag cup 8, and is thereby moved toward or away from the rotor 10. The pressurizing force of the wave spring washer 19 on the outside cleated disc 18 is thereby decreased or increased. The disc 18 is kept from rotation by the notches 8A in the main bearing retainer drag cup 8.

The rotation of the rotor 10 is stopped when the tension adjusting drum 20 is rotated into complete engagement against the rotor 10.

Figure 5:
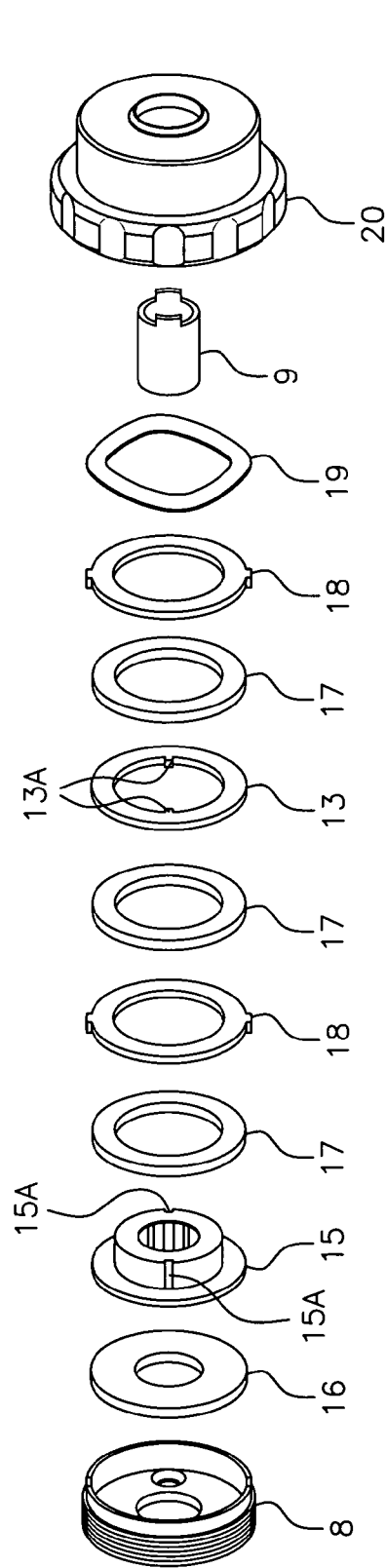
FIG. 5 is an exploded perspective view of an optional arrangement of elements of the spinning reel of the embodiment shown in FIG. 3.

In the embodiment shown in FIG. 5, the addition of an inside cleated braking disc 13, an addition of another outside cleated disc 18 and two additional frictioning members 17 add more frictional surface area for larger reels. The cleats 13A on the inside cleated braking disc 13 ride in notches 15A in the one way roller clutch braking assembly 15, allowing for tension adjustment. The braking disc of the one way roller clutch braking assembly may also be connected to the one way roller clutch in this manner.

Figure 4:
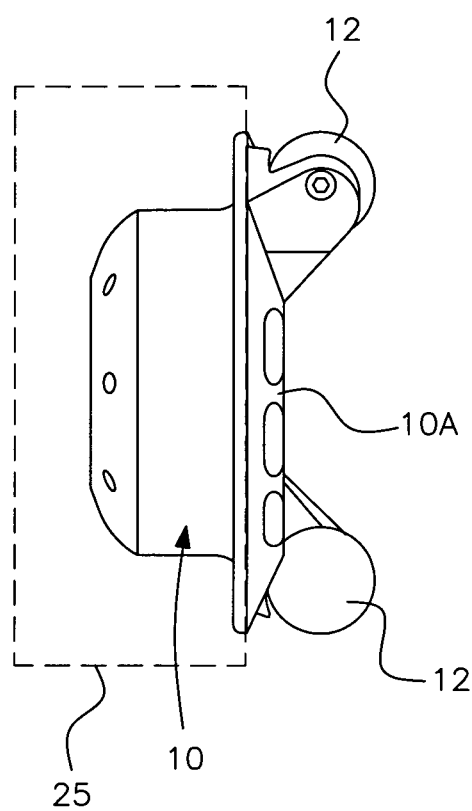
FIG. 4 is a side view of an essential part of the present invention showing an area of a rotor free of protrusions.

As shown in FIG. 4, the area 25 of the rotor 10 which is free of protrusions, provides an area for additional manual drag force to be applied by the palm or finger of the angler's hand.

Figure 6:
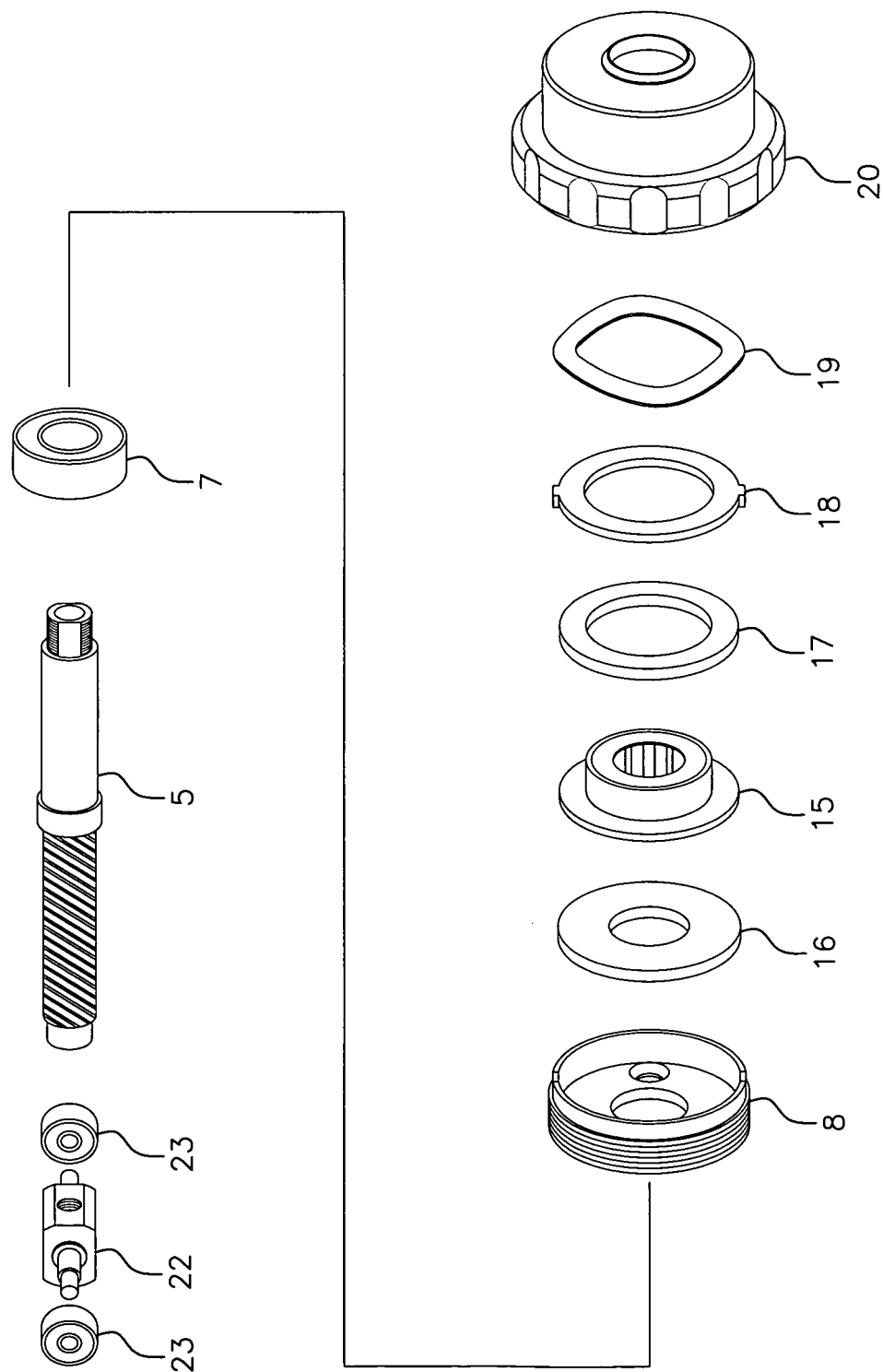

In the alternate embodiments of FIGS. 6 and 7, the clutch sleeve is omitted. In these embodiments, the one way roller clutch assembly grips the pinion gear shaft.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A spinning reel for fishing, said spinning reel comprising
    a housing,
    a pinion gear shaft,
    a rotor rotatably mounted on a front part of said housing, said rotor being rotated in accordance with rotation of said pinion gear shaft,
    a spool provided inside a front end of said rotor, said spool making a reciprocating motion in an axial direction in accordance with rotation of said pinion gear shaft,
    a drag cup with external threads and a notch in the drag cup facing the rotor,
    a clutch sleeve mounted on the front part of the housing, non-rotatably attached to the pinion gear shaft and the rotor,
    a one-way roller clutch braking assembly located in the drag cup and surrounding the clutch sleeve, the one-way roller clutch braking assembly controllably locking on the clutch sleeve as the rotor rotates backwards and the one-way roller clutch braking assembly releasing the clutch sleeve as the rotor rotates forward, and
    at least one friction disc located on both sides of the one-way roller clutch braking assembly.

2. The spinning reel as claimed in claim 1, wherein a tension adjusting drum engages the rotor and locks the rotor against rotation.

3. The spinning reel as claimed in claim 2, wherein the tension adjusting drum includes internal threads engaging the drag cup for controlling drag of the rotor.

4. The spinning reel as claimed in claim 3, wherein the tension adjusting drum is located between the housing and the rotor.

5. The spinning reel as claimed in claim 1, wherein the rotor includes line roller guides mounted on a flange of said rotor and said rotor is free of protrusions from the flange to a drag end of the rotor.

6. The spinning reel as claimed in claim 1, wherein a wave spring washer applies pressure to the friction discs and the one-way roller clutch braking assembly in the drag cup.

7. The spinning reel as claimed in claim 6, wherein the wave spring washer engages a cleated disc, and the cleated disc cooperates with grooves in the drag cup.

8. The spinning reel as claimed in claim 1, wherein a tension adjusting drum includes internal threads engaging the external threads of the drag cup.

9. The spinning reel as claimed in claim 8, wherein control of the locking and the releasing of the one-way roller clutch braking assembly is obtained by rotation of the tension adjusting drum.

10. The spinning reel as claimed in claim 1, wherein there are three of the friction discs located on one side of the one-way roller clutch braking assembly.

11. The spinning reel as claimed in claim 10, wherein the one side of the one-way roller clutch braking assembly having the three friction discs includes at least a cleated braking disc.

12. The spinning reel as claimed in claim 11, wherein the cleated braking disc includes cleats cooperating with grooves on the one-way roller clutch braking assembly.

13. The spinning reel as claimed in claim 12, wherein the cleated braking disc includes internal cleats.

14. The spinning reel as claimed in claim 11, wherein the cleated braking disc includes external cleats.

15. A spinning reel for fishing, said spinning reel comprising
    a housing,
    a pinion gear shaft,
    a rotor mounted at one end of the pinion gear shaft,
    a reciprocating spool mounted inside said rotor,
    a drag cup with external threads, said drag cup being mounted on said housing,
    a clutch sleeve non-rotatably mounted on the pinion gear shaft and the rotor,
    a one-way roller clutch braking assembly located in the drag cup and surrounding the clutch sleeve, the one-way roller clutch braking assembly controllably locking on the clutch sleeve as the rotor rotates backwards and the one-way roller clutch braking assembly releasing the clutch sleeve as the rotor rotates forward,
    a tension adjusting drum having internal threads, said tension adjusting drum being rotatably mounted on said drag cup by said external threads and said internal threads, and
    a spring washer biasing said one-way roller clutch braking assembly towards said drag cup and away from said tension adjusting drum,
    said tension adjusting drum being rotated to control drag of the rotor and thereby fishing line leaving said reciprocating spool.

16. The spinning reel as claimed in claim 15, wherein the tension adjusting drum engages the rotor and locks the rotor against rotation.

17. The spinning reel as claimed in claim 15, wherein the rotor includes line roller guides mounted on a flange of said rotor and said rotor is free of protrusions from the flange to a drag end of the rotor.

18. The spinning reel as claimed in claim 15, wherein a spring washer holds the one-way roller clutch braking assembly in the drag cup.

19. A spinning reel for fishing, said spinning reel comprising
    a housing,
    a pinion gear shaft,
    a rotor rotatably mounted on a front part of said housing, said rotor being rotated in accordance with rotation of said pinion gear shaft,
    a spool provided inside a front end of said rotor, said spool making a reciprocating motion in an axial direction in accordance with rotation of said pinion gear shaft,
    a drag cup with external threads and a notch in the drag cup facing the rotor,
    a one-way roller clutch braking assembly located in the drag cup and surrounding the pinion gear shaft, the one-way roller clutch braking assembly controllably locking on the pinion gear shaft as the rotor rotates backwards and the one-way roller clutch braking assembly releasing the pinion gear shaft as the rotor rotates forward, and
    at least one friction disc located on both sides of the one-way roller clutch braking assembly.

* * * * *

UNITED STATES PATENT AND TRADEMARK OFFICE
CERTIFICATE OF CORRECTION

PATENT NO. : 8,469,300 B2  
APPLICATION NO. : 13/137132  
DATED : June 25, 2013  
INVENTOR(S) : Charles D. Camp It is certified that error appears in the above-identified patent and that said Letters Patent is hereby corrected as shown below:

On the Title Page, the Assignee should be changed from "(73) Assignee: Eastaboga Tacle Mfg. Co., Inc., Eastaboga, AL (US)" to --(73) Assignee: Eastaboga Tackle Mfg. Co., Inc., Eastaboga, AL (US)--

Signed and Sealed this  
Fifth Day of November, 2013

Teresa Stanek Rea  
*Deputy Director of the United States Patent and Trademark Office*